United States Patent
Ajioka

(10) Patent No.: US 10,560,586 B2
(45) Date of Patent: Feb. 11, 2020

(54) CONTROLLER, COLOR CHART AND NON-TRANSITORY RECORDING MEDIUM STORING COMPUTER-READABLE PROGRAM FOR MANAGING PRINT PRODUCTS

(71) Applicant: Konica Minolta, Inc., Tokyo (JP)

(72) Inventor: Takashi Ajioka, Tokyo (JP)

(73) Assignee: Konica Minolta, Inc., Tokyo (JP)

( * ) Notice: Subject to any disclaimer, the term of this patent is extended or adjusted under 35 U.S.C. 154(b) by 33 days.

(21) Appl. No.: 15/908,104

(22) Filed: Feb. 28, 2018

(65) Prior Publication Data

US 2018/0255187 A1 Sep. 6, 2018

(30) Foreign Application Priority Data

Mar. 2, 2017 (JP) .................. 2017-038915

(51) Int. Cl.
- *H04N 1/00* (2006.01)
- *H04N 1/23* (2006.01)
- *G06K 15/02* (2006.01)
- *G06F 3/12* (2006.01)

(52) U.S. Cl.
CPC ..... *H04N 1/00034* (2013.01); *H04N 1/00045* (2013.01); *H04N 1/00068* (2013.01); *H04N 1/2392* (2013.01)

(58) Field of Classification Search
None
See application file for complete search history.

(56) References Cited

U.S. PATENT DOCUMENTS

| | | | |
|---|---|---|---|
| 5,196,927 A * | 3/1993 | Warner | H04N 1/6033 358/515 |
| 2001/0055052 A1* | 12/2001 | Mueller | B41J 2/17593 347/88 |
| 2002/0059879 A1* | 5/2002 | Komori | B41F 33/0036 101/484 |
| 2003/0063338 A1* | 4/2003 | Gudaitis | H04N 1/6033 358/519 |

(Continued)

FOREIGN PATENT DOCUMENTS

| | | | | |
|---|---|---|---|---|
| JP | 2011230413 | * | 11/2011 | H04N 1/60 |
| JP | 2016-061589 A | | 4/2016 | |

(Continued)

*Primary Examiner* — Beniyam Menberu
(74) *Attorney, Agent, or Firm* — Osha Liang LLP

(57) ABSTRACT

Provided are a controller, a color chart and a non-transitory recording medium. The color chart includes a first patch that is a halftone patch of first color, a second patch that is the halftone patch of the first color underlaid with a solid base of second color, and comparative patches prepared by increasing and decreasing the tone of the first color of the first patch and second patch, where the printed surface of the color chart is finished with transparent material. The controller calculates tone values or dot gains of the first patch and second patch based on the measured color values of the patches in the color chart, and determines the current condition of print and the current condition of a finished surface by using a comparison result of the tone values or dot gains of the first patch and second patch with respective reference values.

14 Claims, 9 Drawing Sheets

(56) References Cited

U.S. PATENT DOCUMENTS

| | | | | |
|---|---|---|---|---|
| 2003/0112455 A1* | 6/2003 | Ueda | H04N 1/6033 | 358/1.9 |
| 2003/0156299 A1* | 8/2003 | Martinez | G06K 15/00 | 358/1.9 |
| 2004/0233463 A1* | 11/2004 | Hersch | B41M 1/18 | 358/1.9 |
| 2006/0126135 A1* | 6/2006 | Stevens | H04N 1/6033 | 358/504 |
| 2007/0019258 A1* | 1/2007 | Hattori | H04N 1/603 | 358/518 |
| 2007/0091138 A1* | 4/2007 | Hersch | B41F 33/0036 | 347/19 |
| 2007/0279688 A1* | 12/2007 | Gasczyk | B41C 1/00 | 358/1.16 |
| 2011/0048264 A1* | 3/2011 | Bastidas | C09D 11/40 | 101/450.1 |
| 2011/0216120 A1* | 9/2011 | Friedman | B41F 33/0045 | 347/19 |
| 2012/0050771 A1* | 3/2012 | Sakatani | G03G 15/0131 | 358/1.9 |
| 2017/0080732 A1* | 3/2017 | Kasahara | B41J 29/393 | |

FOREIGN PATENT DOCUMENTS

| | | | | |
|---|---|---|---|---|
| JP | 2016-063287 A | | 4/2016 | |
| WO | WO-2017020943 A1 * | | 2/2017 | G01B 11/0625 |

* cited by examiner

| PRINT (DENSITY) \ FINISHED SURFACE (THICKNESS) | LOWER LIMIT | OPTIMUM | HIGHER LIMIT |
|---|---|---|---|
| LOWER LIMIT | PA: 66<br>PB: 53 | PA: 68<br>PB: 54 | PA: 70<br>PB: 55 |
| OPTIMUM | PA: 68<br>PB: 55 | PA: 70<br>PB: 56 | PA: 72<br>PB: 57 |
| HIGHER LIMIT | PA: 70<br>PB: 57 | PA: 72<br>PB: 58 | PA: 74<br>PB: 59 |

CONTROLLER, COLOR CHART AND NON-TRANSITORY RECORDING MEDIUM STORING COMPUTER-READABLE PROGRAM FOR MANAGING PRINT PRODUCTS

CROSS-REFERENCE TO RELATED APPLICATIONS

Japanese Patent Application No. 2017-038915 filed on Mar. 2, 2017, including description, claims, drawings, and abstract, the entire disclosure of which is incorporated herein by reference in its entirety.

BACKGROUND

Technical Field

The present invention is directed to controllers, color charts and non-transitory recording media each storing a computer-readable program for managing print products. In particular, the present invention is directed to controllers for use in a printing system that includes a printer, a finisher for printed-surface finishing and a colorimeter; color charts including patches for managing the condition of print products; and non-transitory recording media each storing computer-readable program for managing print products, to be executed in the controller.

Description of the Related Art

In recent years, in order to give additional value to print products, a process of finishing printed surfaces (printed-surface finishing) with any one of various kinds of transparent material, such as clear varnish coatings, clear toner printings, PP (polypropylene) film laminations, etc., has been increasingly used as a post processing for print products. There exist various kinds of printed-surface finishing with transparent material, according to kinds of transparent material, printing methods, coating or laminating methods and other factors, which are to be employed by the printed-surface finishing. Hereinafter, a term of "applying transparent material" or "application of transparent material" is defined as a generic term of the various kinds of printed-surface finishing above-mentioned, irrespective of a kind of transparent material, a printing method, a coating or laminating method, etc., which are to be actually employed.

For the purpose of protecting surfaces of print products, a certain amount of transparent material needs to be applied onto the surfaces with the application amount of the transparent material being kept at not smaller than a certain level. Whereas, in order to save the consumption of transparent material to be applied onto the surfaces, it is desirable to optimize the application amount the transparent material. Further, for the purpose of adding a special visual effect to print products by using a transparent material pattern, it is necessary to control the application amount of the transparent material so as to fall within predetermined limits.

On the other hand, it is difficult to directly measure the thickness of a transparent material layer on a surface of a paper substrate due to the transparency of the transparent material. It is also difficult to measure the amount of transparent material to be applied, at a stage of ejecting the transparent material or a stage of applying the transparent material, resulting in a large error in the measurement. Since the quality actually required for print products depends on appearances of the finished print products, it is the most desirable that applied transparent material is measured and evaluated at the time of completing printed-surface finishing of print products.

It is widely known that application of transparent material onto printed surfaces of print products increases optical dot gain. Optical dot gain is generally comprehended as apparent growth of halftone dots, which originates from scattering of light within a paper substrate and absorption by a printed halftone dot of scattered light that entered the paper substrate even around the perimeter of the printed halftone dot.

As one example of techniques utilizing the phenomenon that optical dot gain increases due to application of transparent material as above-mentioned, Japanese Patent Application Laid-Open Publication (JP-A) No. 2016-063287 sets forth a technique of color conversion of image data, using a profile created by the following profile creation processing, as an input profile or an output profile. The profile creation processing includes the processes of acquiring a spectral reflectance at a non-coated area, where no protective film is coated, of a print product; estimating an optical property of a protective film; acquiring a spectral distribution of an observation light source; estimating a color changing characteristic originating from a mutual action between the protective film and the print product serving as a substrate thereof; predicting measured color values of the print product coated with the protective film thereon, based on the acquired spectral reflectance, the optical property of the protective film, the spectral distribution of the observation light source and the color changing characteristic originating from the mutual action; and creating a profile based on the color values above-predicted. In addition, JP-A No. 2016-061589 also sets forth a technique similar to the above.

As described above, it is difficult to directly measure the thickness of a transparent material layer on a paper substrate. However, application of transparent material causes a color tone change of a finished print product, and the color tone change can be given from a change of the spectral reflectance measured on a surface of the print product before and after the completion of printed-surface finishing. From the color tone change, the condition of a finished surface of a print product can be evaluated. However, the method of measuring the color tone change needs measurement of the spectral reflectance before and after the printed-surface finishing and it increases a work load in the measuring process. As another method, the color tone change can be measured by creating a transparent material pattern on a printed surface of a paper substrate and measuring the spectral reflectance on the printed surface just after the printed-surface finishing. However, some methods of applying transparent material do not allow creation of a desired transparent material pattern on a printed surface. Further, a transparent material pattern causes unevenness of the physical thickness of the transparent material, and in some cases, it may lead to deterioration of the measurement accuracy of the spectral reflectance and/or the increased measurement difficulty. Accordingly, it is desirable to use a technique which can measure the spectral reflectance or the color tone change, after applying transparent material solidly onto a printed surface so as to make the thickness of the transparent material layer uniform. For the purpose of saving transparent material, it is further desirable to measure the color tone change of finished print products by measuring as few patches as possible.

SUMMARY

One or more embodiments of the invention provide controllers, color charts and non-transitory recording media each storing a computer-readable program for managing print products, which allow an easy and certain management of the condition of print products.

A controller according to one or more embodiments of the present invention is a controller for use in a printing system including a printer, a finisher for printed-surface finishing and a colorimeter. The printer is configured to print a color chart including a first patch being a halftone patch of first color, a second patch being the halftone patch of the first color underlaid with a solid base of second color, and a plurality of comparative patches including patches prepared by increasing and decreasing tone of the first color of the first patch and patches prepared by increasing and decreasing tone of the first color of the second patch, where the second color is different from the first color. The finisher is configured to finish a printed surface of the color chart with transparent material, and the colorimeter is configured to measure color of the first patch, the second patch and the plurality of comparative patches in the color chart finished with the transparent material. The controller comprises a hardware processor and a storage unit operatively connected to the hardware processor, storing a computer-readable program comprising instructions which, when executed by the hardware processor, cause the hardware processor to perform the following operations. The operations comprise: obtaining measured color values of the first patch, the second patch and the plurality of comparative patches, from the colorimeter; calculating a tone value or dot gain of each of the first patch and the second patch, on the basis of the obtained measured color values; and determining current condition of print given by the printer and current condition of a finished surface given by the finisher, by using a result of comparison of the tone values or the dot gains of the first patch and the second patch with respective reference values.

A color chart according to one or more embodiments of the present invention is a color chart to be used for determining either or both of current condition of print and current condition of a finished surface of a print product printed by a printer and finished with transparent material by a finisher. The color chart comprises: a first patch being a halftone patch of first color; a second patch being the halftone patch of the first color underlaid with a solid base of second color which is different from the first color; a plurality of comparative patches including patches prepared by increasing and decreasing tone of the first color of the first patch and patches prepared by increasing and decreasing tone of the first color of the second patch; and a layer of the transparent material applied onto the first patch, the second patch and the plurality of comparative patches.

A non-transitory recording medium according to one or more embodiments of the present invention stores a computer-readable program to be executed in a controller in a printing system including a printer, a finisher for printed-surface finishing and a colorimeter. The program comprises instructions which, when executed by a hardware processor of the controller, cause the hardware processor to perform the following operations. The operations comprise: obtaining measured color values of patches in a color chart from the colorimeter, where the color chart includes a first patch being a halftone patch of first color, a second patch being the halftone patch of the first color underlaid with a solid base of second color which is different from the first color, and a plurality of comparative patches including patches prepared by increasing and decreasing tone of the first color of the first patch and patches prepared by increasing and decreasing tone of the first color of the second patch. The color chart is printed by the printer and finished by the finisher with transparent material. The operations further comprise: calculating a tone value or dot gain of each of the first patch and the second patch, on the basis of the measured color values; and determining current condition of print given by the printer and current condition of a finished surface given by the finisher, by using a result of comparison of the tone values or the dot gains of the first patch and the second patch with respective reference values.

BRIEF DESCRIPTION OF THE DRAWINGS

The advantages and features provided by one or more embodiments of the invention will become more fully understood from the detailed description given hereinbelow and the appended drawings which are given by way of illustration only, and thus are not intended as a definition of the limits of the present invention, wherein.

DETAILED DESCRIPTION OF EMBODIMENTS

Figure 1:
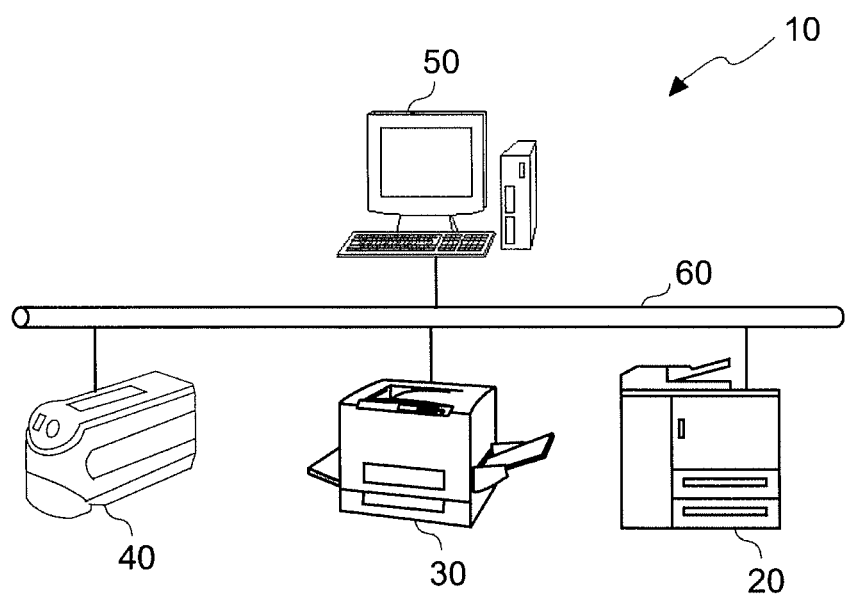
FIG. 1 is a schematic diagram illustrating an example of the constitution of a printing system according to one or more embodiments of the present invention.

Hereinafter, embodiments of the present invention will be described with reference to the drawings. However, the scope of the invention is not limited to the illustrated embodiments.

As noted in the BACKGROUND, printed-surface finishing with transparent material, such as clear varnish coatings, clear toner printings, PP (polypropylene) film laminations, etc., has been increasingly used as a post processing of print products. In the printed-surface finishing as above-mentioned, in order to save the consumption of transparent material to be applied onto the surfaces, it is desirable to optimize the application amount of transparent material. Further, in order to add a special visual effect to print products by using a transparent material pattern, it is necessary to control the application amount of transparent material so as to fall within predetermined limits. However, it is difficult to measure the thickness of a transparent material layer on a surface of a paper substrate due to the transparency of the transparent material. In addition, it is also difficult to measure the amount of transparent material at a stage of ejecting the transparent material or a stage of applying the transparent material, resulting in a large error in the measurement.

On the other hand, it is widely known that application of transparent material onto printed surfaces of print products increases optical dot gain. From the above-mentioned fact that optical dot gain increases due to application of transparent material, the condition of a finished surface of a print product can be evaluated by measuring the color tone change of finished print products, rather than by directly measuring the application amount of transparent material. However, the method of measuring the color tone change by a change of the spectral reflectance measured on a surface of the print product before and after the completion of printed-surface finishing, increases a work load in the measuring process. In another method of measuring the color tone change by creating a transparent material pattern on a printed surface of a paper substrate and measuring the spectral reflectance on the surface just after the printed-surface finishing, some methods of applying transparent material do not allow creation of a desired transparent material pattern on a printed surface. Further, a transparent material pattern causes unevenness of the physical thickness of the transparent material, and in some cases, it may lead to deterioration of the measurement accuracy of the spectral reflectance and/or the increased measurement difficulty.

Dot gain of print products is constituted by physical dot gain and optical dot gain, nevertheless, measured as a combined value of the both. Physical dot gain depends on both color tone curves specified in print settings and the condition of print (the actual size of printed halftone dots), while the optical dot gain mainly depends on the condition of a finished surface of a paper substrate. Owing to this reason, it is difficult to discriminate and separate the physical dot gain and the optical dot gain from each other by measuring only a single color patch.

In view of that, there are provided a color chart and a printing system for managing quality of print products by using the color chart. The color chart includes a plurality of patches configured to cause a controller in the printing system to separate an effect of physical dot gain and that of optical dot gain. The printing system is configured to perform the following operations. The color chart is printed by a printer in the printing system and the printed surface of the color chart is finished by a finisher in the printing system with transparent material so that the transparent material are applied onto the plurality of patches uniformly. Using a result of color measurement of the plurality of patches in the finished surface of the color chart by a colorimeter in the printing system, the controller determines the current condition of print given by the printer and the current condition of a finished surface of print products given by the finisher. A concrete description is given of the operations, with referring to the drawings.

Figure 13A:
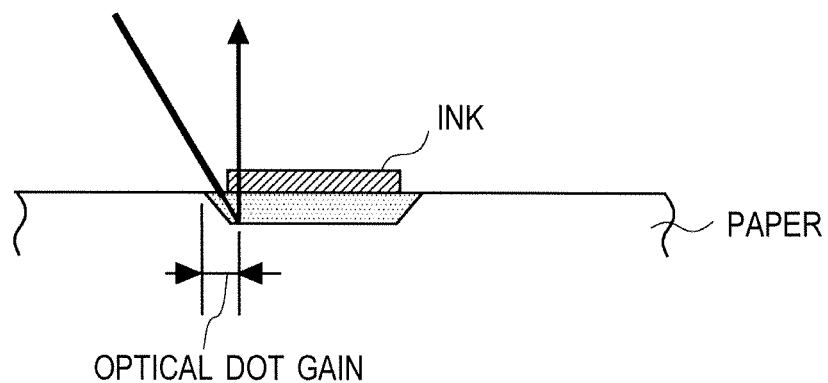
FIGS. 13A, 13B and 13C are schematic diagrams for illustrating optical dot gain according to one or more embodiments of the present invention.
Figure 13B:
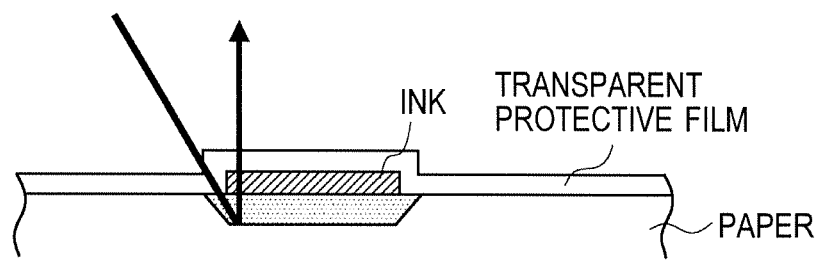
Figure 13C:
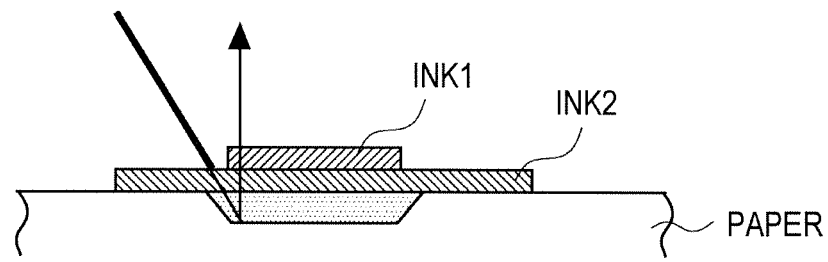

FIGS. 13A through 13C are explanatory schematic diagrams for illustrating the phenomenon of optical dot gain. As illustrated in FIG. 13A, the optical dot gain is generally comprehended as apparent growth in size of a halftone dot of ink, which originates from the fact that light entering a paper substrate around the perimeter of the halftone dot of ink exits from the paper substrate through the halftone dot of ink after being scattered inside the paper substrate (in other words, light entering a paper substrate around the perimeter of the halftone dot of ink, is absorbed by the ink halftone dot of ink). In a case where a printed surface of a paper substrate is finished by application of transparent material, such as transparent varnish or the like, onto the surface so as to form a transparent protective film as illustrated in FIG. 13B, it makes the roughness of the surface of the paper substrate smooth more than ever and decreases scattering of light on the surface of the paper substrate, which results in an increase of light entering the paper substrate and an increase of dot gain, as illustrated by the arrow in FIG. 13B. The amount of optical dot gain increases corresponding to the application amount of transparent material. In another case where there is a dot of first color ink (INK1) underlaid with a base of second color ink (INK2) as illustrated in FIG. 13C, the base of second color ink absorbs both light entering a paper substrate around the perimeter of the dot and light scattered inside the paper substrate, which results in a decrease of optical dot gain, as illustrated by the arrow in FIG. 13C.

As noted in the foregoing, optical dot gain is influenced by not only transparent material, but also color material applied as a base under halftone dots. Accordingly, one or more embodiments of the present invention employ a color chart including patches made of color material of first color and color material of second color to be used for a base. In view of the material consumption saving, it is desirable that the color chart is prepared so that the condition of print and the condition of finished surfaces of finished print products can be determined by measuring as fewer patches as possible.

To meet the above-demand, a printing system according to one or more embodiments of the present invention performs the following operations, where the printing system includes a printer, a finisher for printed-surface finishing (a printed-surface finisher) and a colorimeter. The printer prints a color chart including a first patch being a halftone patch of first color, a second patch being the halftone patch of the first color underlaid with a solid base of second color and plural comparative patches prepared by increasing and decreasing the tone of the first color of each of the first patch and the second patch. The finisher then finishes the color chart by applying transparent material onto a printed surface of the color chart, and the colorimeter measures the patches in the finished color chart. The controller then calculates tone values (or dot gains) of the first patch and the second patch, on the basis of measured color values of the patches in the color chart obtained from the colorimeter, and compares the tone value (or dot gain) of each of the first patch and the second patch with a corresponding reference value, so as to effectively separate the component of optical dot gain from the total dot gain and determine the current condition of print given by the printer and the current condition of a finished surface of a print product given by the finisher.

In concrete terms, on the basis of the measured color values of the patches in the color chart, the controller calculates tone values (or dot gains) of the first patch and the second patch, where the first patch is a halftone patch of first color (for example, a patch of 50% first color or a "50% first color" patch), and the second patch is the halftone patch of the first color underlaid with a solid base of second color (for example, a patch of 50% first color with a base of 100% second color or a "50% first color and 100% second color" patch). The controller then compares the tone values (or the dot gains) of the first patch and the second patch with respective reference values, to check the variation tendency (increase or decrease) of the tone value (or the dot gain) of each of the first patch and the second patch from the corresponding reference value. Using the difference between the first patch and the second patch in the variation tendency of the tone value or dot gain from the corresponding reference value (in other words, the difference between the first patch and the second patch in the influential degree of physical dot gain and that of optical dot gain), the controller determines whether the density or tone level of print given by the printer is high or low (in other words, the current condition of print given by the printer), and/or whether the thickness of a transparent material layer on the printed surface given by the finisher is thick or thin (in other words, the current condition of a finished surface given by the finisher). On the basis of the determination result, the controller may perform feedback control of the printer or the finisher, by adjusting print settings for the printer or finishing settings for the finisher.

When calculating the tone values (or dot gains), the controller may use the measured color value of the first patch and the measured color values of the comparative patches prepared by increasing and decreasing the tone of the first color of the first patch, to calculate the tone value (or dot gain) of the first patch, and may use the measured color value of the second patch and the measured color values of the comparative patches prepared by increasing and decreasing the tone of the first color of the second patch, to calculate the tone value (or dot gain) of the second patch. In the determination, on judging that the calculated tone value (or dot gain) of the first patch differs from the corresponding reference value by a first value and the calculated tone value (or dot gain) of the second patch differs from the corresponding reference value by a second value being the same as the first value, the controller may determine that the print is in unacceptable condition, and on judging that the calculated tone value (or dot gain) of the first patch differs from the corresponding reference value by a first value and the calculated tone value (or dot gain) of the second patch differs from the corresponding reference value by a second value being smaller than the first value, the controller may determine that the finished surface is in unacceptable condition. In the determination, the controller may further causes a display unit of the controller to display a determination result of at least one of the current condition of the print and the current condition of the finished surface, and may cause the display unit to display the calculated tone values (or dot gains) of the first patch and the second patch together with a table or a graph representing an acceptable range of the tone values (or dot gains), in other words, a range of tone values (or dot gains) corresponding to at least one of the acceptable condition of the print and the acceptable condition of the finished surface.

The above operations allow the controller to manage the condition of print and the condition of finished surfaces of print products with one time measurement of a few patches, which can provide stable quality and enhanced productivity of print products.

Figure 2:
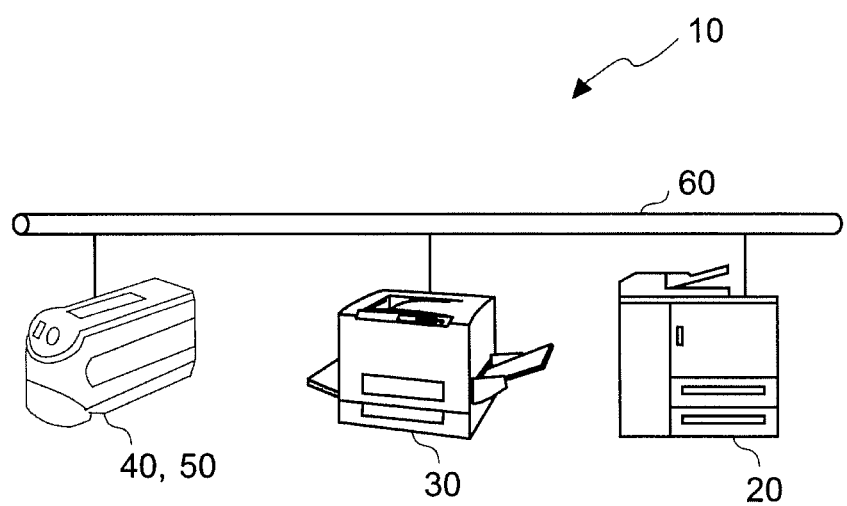
FIG. 2 is a schematic diagram illustrating another example of the constitution of the printing system according to one or more embodiments of the present invention.
Figure 3:
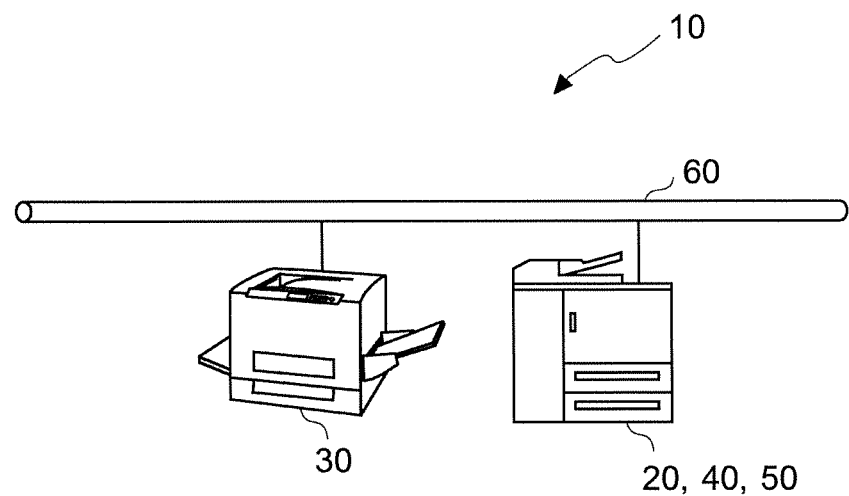
FIG. 3 is a schematic diagram illustrating another example of the constitution of the printing system according to one or more embodiments of the present invention.
Figure 4:
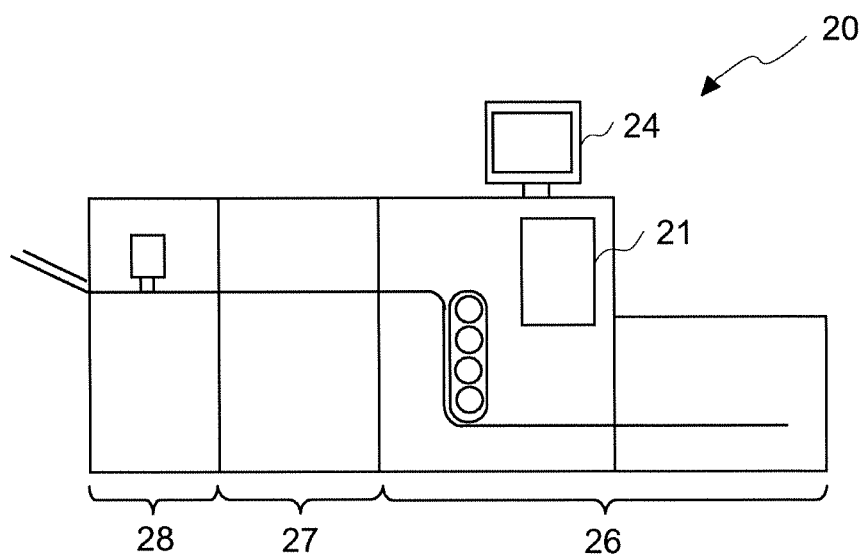
FIG. 4 is a schematic diagram illustrating an example of a printer according to one or more embodiments of the present invention.
Figure 5A:
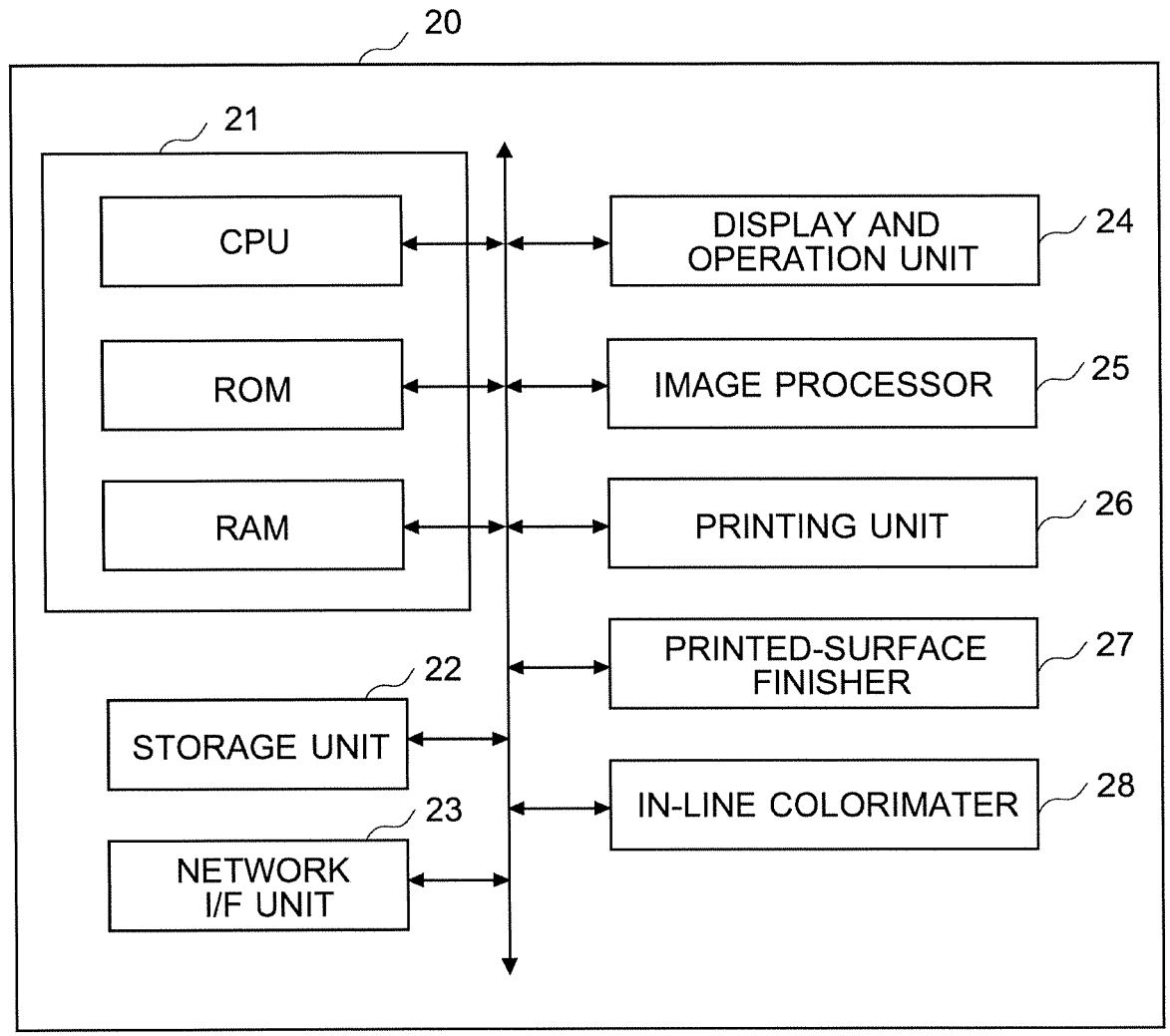
FIGS. 5A and 5B are block diagrams illustrating an example of the constitution of a printer according to one or more embodiments of the present invention.
Figure 5B:
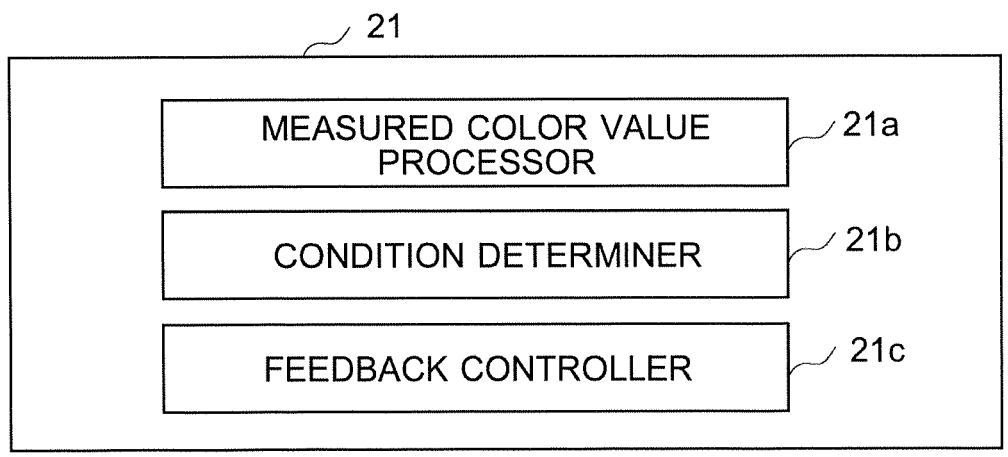
Figure 6:
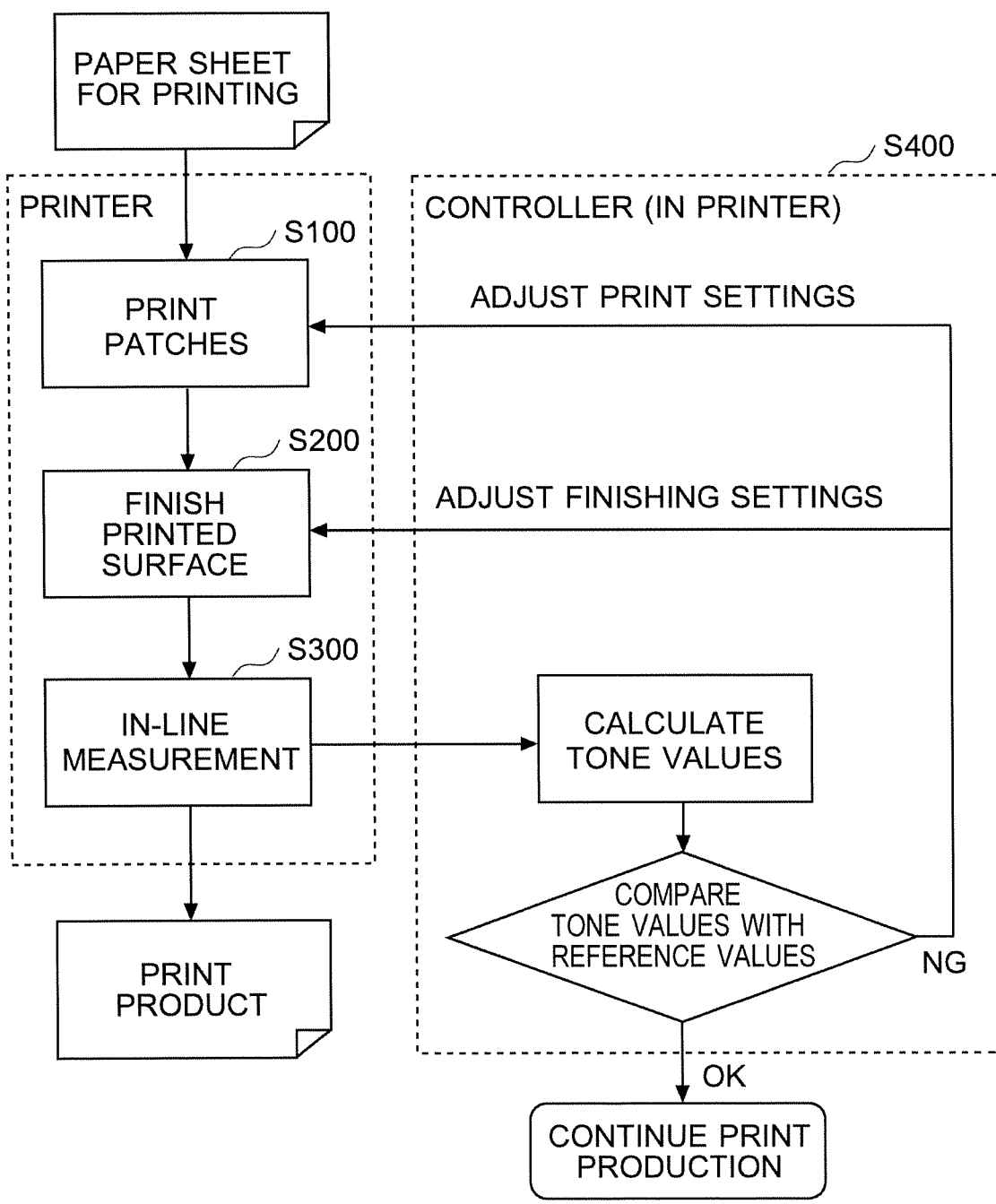
FIG. 6 is a flowchart schematically illustrating an example of operations of the printer according to one or more embodiments of the present invention.
Figure 7:
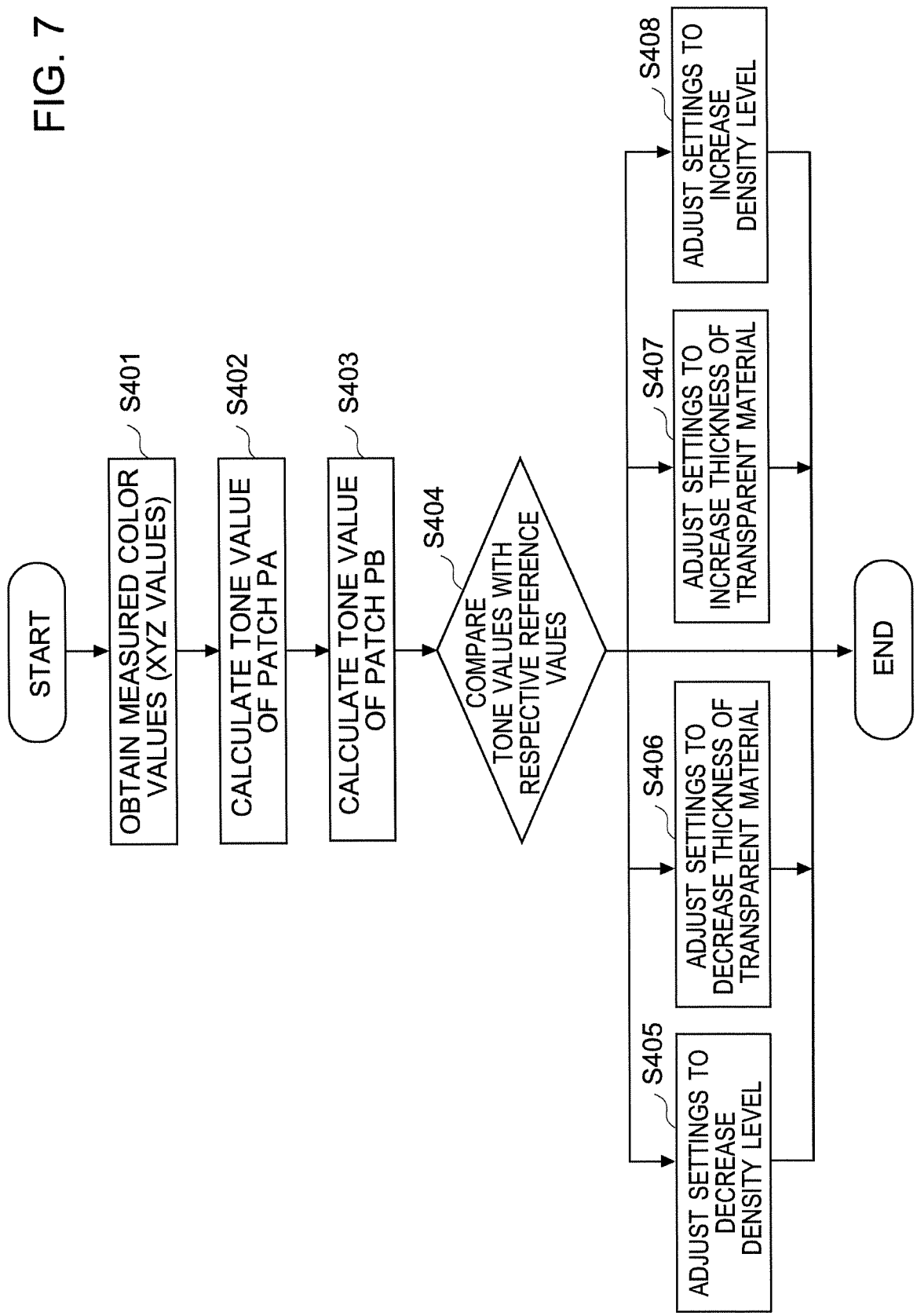
FIG. 7 is a flowchart illustrating an example of feedback control to be performed by the printer according to one or more embodiments of the present invention.
Figures 8, 9:
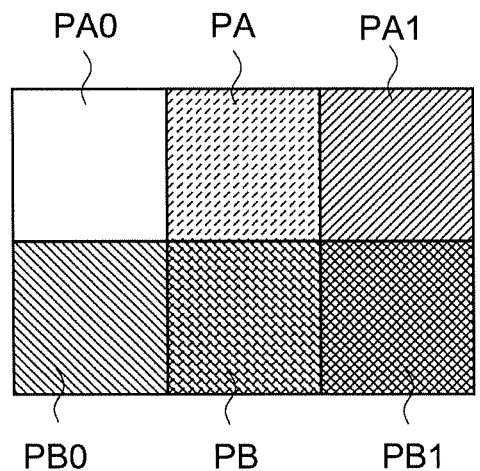
FIG. 8 is a schematic diagram illustrating an example of patches for use in a method of managing print products according to one or more embodiments of the present invention.
FIG. 9 is a table of tone values of patches according to one or more embodiments of the present invention, representing the range of tone values corresponding to the acceptable condition of print and the range of tone values corresponding to the acceptable condition of a finished surface.
Figure 10:
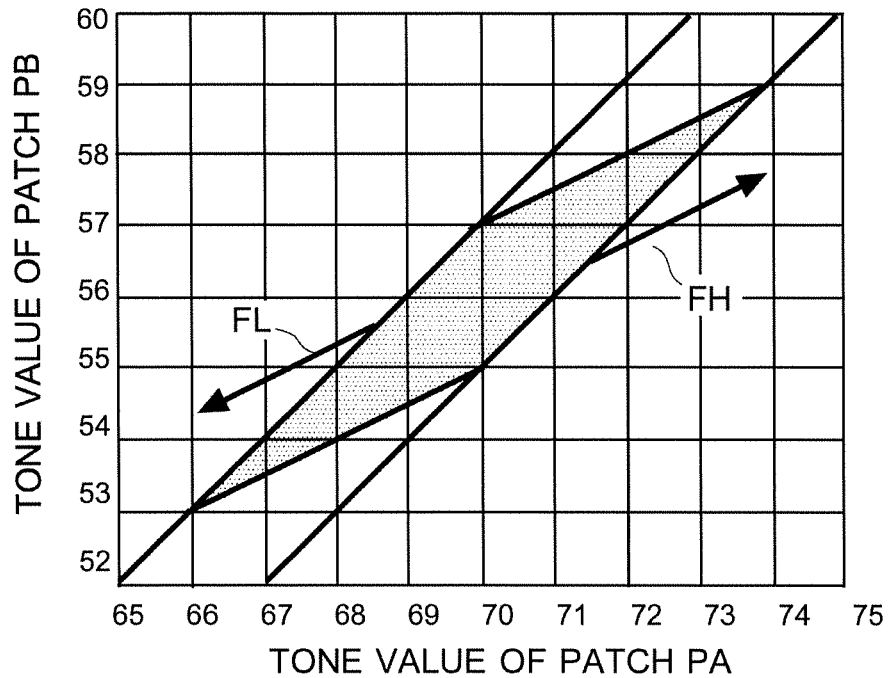
FIG. 10 is a graph of tone values of patches according to one or more embodiments of the present invention, representing correlation of the tone values with condition of a finished surface.
Figure 11:
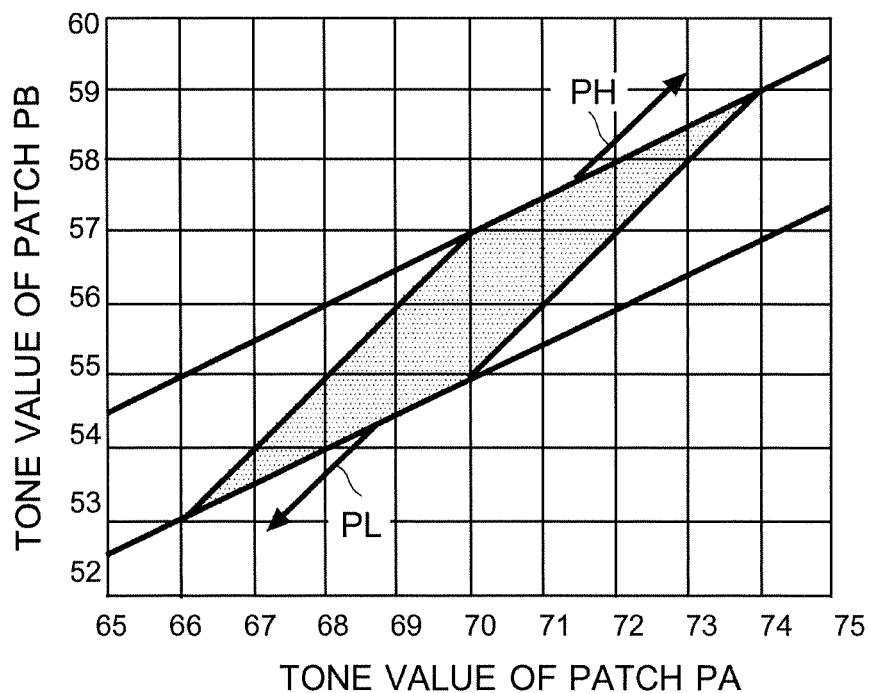
FIG. 11 is a graph of tone values of patches according to one or more embodiments of the present invention, representing correlation of the tone values with condition of print.
Figure 12:
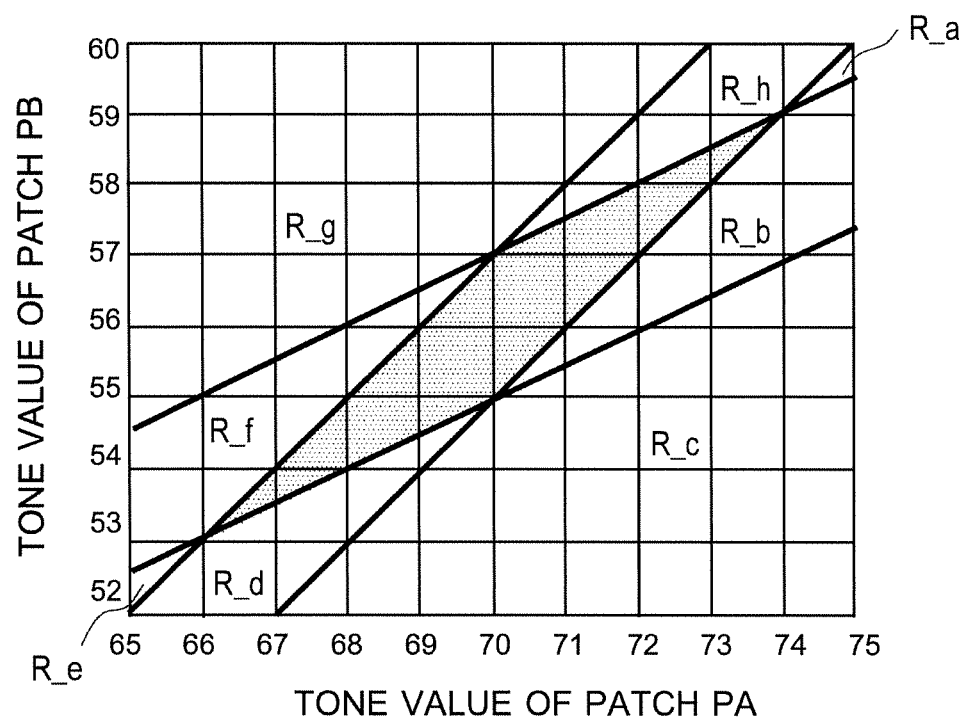
FIG. 12 is a graph of tone values of patches according to one or more embodiments of the present invention, representing correlation of the tone values with condition of print and condition of a finished surface.

In order to describe one or more embodiments of the present invention in detail, a description is given of a controller, a method of managing print products, a color chart and a non-transitory recording medium storing a computer-readable program for managing print products, each in accordance with one or more embodiments of the present invention, with reference to FIGS. 1 through 12. FIGS. 1 to 3 are schematic diagrams illustrating constitution examples of a printing system according to one or more embodiments of the present invention. FIG. 4 is a schematic diagram illustrating a printer according to one or more embodiments of the present invention, and FIGS. 5A and 5B are block diagrams illustrating a constitution example of the printer illustrated in FIG. 4. Each of FIGS. 6 and 7 is a flowchart illustrating an example of operations of the printer according to one or more embodiments of the present invention. FIG. 8 is a schematic diagram illustrating an example of patches for use in a method of managing print products according to one or more embodiments of the present invention, and FIG. 9 is a table representing an acceptable range of tone values of the patches in FIG. 8. Each of FIGS. 10 to 12 is a graph of correlation of the tone values with at least one of condition of print and condition of finished surfaces of print products.

As illustrated in FIG. 1, printing system 10 according to one or more embodiments of the present invention includes printer 20 such as an electrophotographic printer and so on, printed-surface finisher 30 (also referred to as a finisher for printed-surface finishing) such as a varnish-use inkjet printer and so on, colorimeter 40 such as an in-line colorimeter or the like, and controller 50 (for instance, a computing device for controlling colorimeter 40). These devices are communicatively connected to each other via communication network 60, where examples of the communication network 60 include a LAN (Local Area Network) and a WAN (Wide Area Network), conforming to a standard, for example, Ethernet, Token Ring, or FDDI (Fiber-Distributed Data Interface).

It should be noted that printer 20, printed-surface finisher 30 and colorimeter 40 may be arranged and connected in an arbitrary manner in the system, as illustrated in FIGS. 1 to 4. For example, these devices may be connected to each other in an in-line configuration or arranged so as to support a near-line connection. In the system configuration illustrated in FIG. 1, controller 50 is disposed as a separated device independent from printer 20, printed-surface finisher 30 and colorimeter 40. Alternatively, controller 50 may be incorporated within any one of the devices as a built-in controller (for instance, may be incorporated within colorimeter 40 as illustrated in FIG. 2 or may be incorporated within printer 20 as illustrated in FIG. 3). Further, colorimeter 40 may be installed in the system as an independent device, or, as illustrated in FIG. 3, may be incorporated within printer 20 as an in-line colorimeter. Still further, printed-surface finisher 30 may be installed in the system as an independent device, or, as illustrated in FIG. 4, may be incorporated within printer 20 as a built-in printed-surface finisher (for example, an offset printing machine having a cylinder for high-gloss coating may be employed as printer 20). Still further, those devices may be incorporated within one apparatus, as printer 20 illustrated in FIG. 4, where the printer 20 in FIG. 4 includes built-in controller 21 serving as controller 50, built-in printed-surface finisher 27 serving as printed-surface finisher 30 and in-line colorimeter 28 serving as colorimeter 40, additionally to display and operation unit 24 and printing unit (print engine) 26. Hereinafter, a concrete description of the printer 20 illustrated in FIG. 4 is given.

As illustrated in FIGS. 4 and 5A, printer 20 includes built-in controller 21, storage unit 22, network interface (I/F) unit 23, display and operation unit 24, image processor 25, printing unit 26 and printed-surface finisher 27 and in-line colorimeter 28.

Built-in controller 21 includes a CPU (Central Processing Unit) and memories, such as a ROM (Read Only Memory) and a RAM (Random Access Memory). The CPU is configured to read control programs stored in the ROM or storage unit 22, loads the control programs onto the RAM, and executes the control programs, thereby performing the whole operations of printer 20.

Storage unit 22 includes a memory, such as a HDD (Hard Disk Drive), a SSD (Solid State Drive) or the like. Storage unit 22 stores programs which, when being executed, causes the CPU to control the components of printer 20; information about processing and functions of printer 20; a table representing an acceptable range of tone values; graphs representing correlation of tone values with at least one of condition of print and condition of finished surfaces of print products; and other data.

Network I/F unit 23 includes a NIC (Network Interface Card) and/or a modem. The network I/F unit 23 communicatively connects printer 20 to communication network 60 so as to establish data communications with client terminals and other devices.

Display and operation unit 24 is configured to display various screens including a setup screen for print settings and finishing settings, and receive operator's instructions thereon so as to allow the operator to perform setup operations of print settings and finishing settings. Examples of the display and operation unit 24 include a touch screen in which a pressure-sensitive operation unit (a touch sensor) composed of lattice-shaped transparent electrodes is arranged on a display unit like a LCD (Liquid Crystal Display) or an OEL (organic electroluminescence) display.

Image processor 25 serves as a raster-image processor (RIP). Image processor 25 is configured to use a print job sent from a client terminal, to perform image processing, such as color conversion, screening, rasterization and other processing, on image data given from the print job, and send the processed image data to printing unit 26.

Printing unit 26 is a print engine configured to use the processed image data to perform printing (form images on sheets) according to print settings defined in advance. In concrete terms, in the printing unit 26, an exposure unit irradiates a photoreceptor drum, which was charged by a charging unit, with a laser beam in accordance with a given image, to form a latent image on the photoreceptor drum. A developing unit then develops the latent image by adhering charged toner onto the photoreceptor drum, and the developed toner image is transferred onto a transfer belt (first transfer processing), further is transferred from a transfer belt onto a sheet of paper (second transfer processing), and is fixed onto the sheet by a fixing unit.

Printed-surface finisher 27 is a built-in finisher for printed-surface finishing, configured to finish printed surfaces of print products given by printing unit 26 (printed-surface finishing) with transparent material, such as a clear varnish, clear toner and PP film, by applying transparent material onto the printed surface according to finishing settings defined in advance. For example, for finishing with a clear varnish, printed-surface finisher 27 applies clear varnish onto a printed surface of a sheet given after a printing process. For finishing with a clear toner, printed-surface finisher 27, in a process of forming images onto sheets with color toners, applies clear toner onto all over a printed surface and then fixes the clear toner onto the printed surface by flattening the fused clear toner against a high-glossy belt and cooling the clear toner before stripping paper from the belt. For finishing with a PP film, printed-surface finisher 27 laminates a PP film to a printed surface in a process of post processing.

In-line colorimeter 28 is a color measurement device supporting spectrophotometry (spectrophotometer or spectrocolorimeter) capable of measuring the light intensity at each wavelength, similarly to external colorimeter 40. In-line colorimeter 28 is configured to measure colors of patches printed by printing unit 26 and finished by printed-surface finisher 27, to output measured color values (for example, L*a*b* values, XYZ values, or other color values in a device-independent color space) of the patches as measurement results.

In the block diagram of FIG. 5A, printing unit 26, printed-surface finisher 27 and in-line colorimeter 28 are illustrated as separated components. However, in a case of employing clear toner finishing for the printed-surface finishing, printed-surface finisher 27 may be equipped within printing unit 26. Further, in-line colorimeter 28 may be disposed in a sheet-conveyance path in printing unit 26.

Further, as illustrated in FIG. 5B, built-in controller 21 serves as measured color value processor 21a, condition determiner 21b and feedback controller 21c.

Measured color value processor 21a is configured to perform the following operations. Measured color value processor 21a obtains measured color values of patches from in-line colorimeter 28, and uses the obtained measured color values to calculate, for a first patch and a second patch, a tone value or dot gain which is a value given by subtracting the dot percentage of the concerned patch specified in a data file from the tone value calculated from the measured color values, where the first patch is a halftone patch of first color (referred to as "patch PA" in the following description), and the second patch is the halftone patch of the first color underlaid with a solid base of second color (referred to as "patch PB" in the following description). In concrete terms, measured color value processor 21a uses the measured color value of the first patch and the measured color values of comparative patches for the first patch, prepared by increasing and decreasing the tone of the first color specified for the first patch, to calculate the tone value or the dot gain of the first patch, and further uses the measured color value of the second patch and the measured color values of the comparative patches for the second patch, prepared by increasing and decreasing the tone of the first color specified for the second patch, to calculate the tone value or the dot gain of the second patch. In this calculation, the tone value may be given by using an appropriate formula among various known formulae including the formula using CIE XYZ values specified in ISO 10128 Annex A, the formula using spectral reflectances at a specific wavelength on the basis of the same standard, the Murray-Davies formula, the Yule-Nielsen formula, and so on. A concrete description of a way to obtain the tone value will be given later.

Condition determiner 21b is configured to perform the following operations. Condition determiner 21b uses a table representing an acceptable range of tone values (in other words, a range of tone values corresponding to the acceptable condition of print products) and/or at least one graph representing correlation of tone values with condition of print and/or condition of finished surfaces of print products (graph representing a range of tone values or dot gains corresponding to at least one of the acceptable condition of the print and the acceptable condition of the finished surface), both being prepared and stored in storage unit 22 in advance, to check the condition of print and/or the condition of a finished surface corresponding to the tone values (or dot gains) of the first patch and the second patch calculated by measured color value processor 21a and determine them as the current condition of print given by printing unit 26 and/or the current condition of a finished surface given by printed-surface finisher 27. In concrete terms, condition determiner 21b compares the tone values (or dot gains) of the first patch and the second patch calculated by measured color value processor 21a with respective reference values which have been defined in advance, and then uses a fact that the first patch and the second patch are different in variation tendency of tone value (or dot gain) from the corresponding reference value, to determine whether the level of current condition of the print is higher or lower than reference (in other words, the level of density or tone of the print is higher or lower than a reference value), and/or whether the level of current condition of the finished surface is higher or lower than reference (in other words, whether the thickness of a transparent material layer on the print is greater or smaller than a reference value). For example, when judging that the tone values (or dot gains) of the first patch and the second patch differ from the respective reference values by almost the same value, condition determiner 21b determines that the print given by printing unit 26 is in unacceptable condition. When judging that the tone value (or dot gain) of the first patch differs from the corresponding reference value by a certain value and the tone value (or dot gain) of the second patch differs from the corresponding reference value by a value being smaller than the certain value, condition determiner 21b determines that the finished surface given by printed-surface finisher 27 is in unacceptable condition. Condition determiner 21b is further configured to, as needed, cause display and operation unit 24 to display the tone values (or dot gains) of the first patch and the second patch calculated by measured color value processor 21a, or to display the determination result of at least one of the condition of the print and the condition of the finished surface, for example, display the calculated tone values (or dot gains) of the first patch and the second patch with being associated with (together with) at least one of the above-described table and graphs so as to allow an operator to perform feedback control of printing unit 26 and/or printed-surface finisher 27.

Feedback controller 21c is configured to perform the following operations. Based on the determination result given by condition determiner 21b, feedback controller 21c controls or adjusts print settings for printing unit 26 and/or finishing settings for printed-surface finisher 27. In concrete terms, when judging that the level of the current condition of print is lower than reference (in other words, the level of density or tone of the print is lower or lighter than a reference value), feedback controller 21c performs the feedback control by adjusting the print settings so as to make the density or tone deeper, and when judging that the level of the current condition of print is higher than the reference (in other words, the level of density or tone of the print is higher or deeper than the reference value), feedback controller 21c performs the feedback control by adjusting the print settings so as to make the density or tone deeper lighter. When judging that the level of current condition of a finished surface is lower than reference (in other words, the thickness of a transparent material layer on the print is smaller than a reference value), feedback controller 21c performs the feedback control by adjusting the finishing settings so as to increase the thickness, and when judging that the level of current condition of a finished surface is higher than the reference (in other words, the thickness of a transparent material layer on the printed image is greater than the reference value), feedback controller 21c performs the feedback control by adjusting the finishing settings so as to decrease the thickness.

The measured color value processor 21a, condition determiner 21b and feedback controller 21c may be constituted as hardware devices. Alternatively, the measured color value processor 21a, condition determiner 21b and feedback controller 21c (especially, measured color value processor 21a and condition determiner 21b) may be provided by a print-product management program which causes built-in controller 21 to function as these components when being executed by the CPU. That is, built-in controller 21 may be configured to serve as measured color value processor 21a, condition determiner 21b and feedback controller 21c (especially, measured color value processor 21a and condition determiner 21b), when the CPU executes the print-product management program.

It should be noted that FIG. 1 to FIG. 5B illustrate printing system 10 and printer 20 for illustrative purpose only, and the constitution and control of the printing system 10 and printer 20 may be modified appropriately.

Referring to the flowchart of FIG. 6, a detailed description is given of the flow of the feedback control operations of printer 20.

Initially, printing unit 26 prints a group of patches onto a print sheet according to print settings defined in advance (Step S100). The group of patches include: a first patch being a halftone patch of first color; a second patch being the halftone patch of the first color underlaid with a solid base of second color, which is different from the first color; comparative patches for the first patch, prepared by increasing and decreasing the tone of the first color of the first patch, for calculating the tone value or dot gain of the first patch; and comparative patches for the second patch, prepared by increasing and decreasing the tone of the first color of the second patch, for calculating the tone value or dot gain of the second patch. For instance, as illustrated in FIG. 8, the group of patches is constituted by six patches including: patch PA of first color, being a single-colored halftone patch for calculating a tone value (or dot gain) for the first color; patch PB being a first-color halftone patch underlaid with a solid base of second color for calculating a tone value (or dot gain) for the first color with the second color for the solid base; two comparative patches PA0, PA1 prepared by increasing and decreasing the tone of the first color of the patch PA; and two comparative patches PB0, PB1 prepared by increasing and decreasing the tone of the first color of the patch PB. In this case, the comparative patches PA0 and PA1 are prepared by decreasing the tone of the first color, yellow to 0% to create a patch of paper color (uncolored patch) and by increasing the tone of yellow to 100% to create a 100% yellow patch (a solid patch of yellow); and the comparative patches PB0 and PB1 are prepared by decreasing the tone of yellow to 0% to create a 100% cyan patch (a solid patch of cyan) and by increasing the tone of yellow to 100% to create a 100% cyan and 100% yellow patch (a solid patch of yellow underlaid with a solid base of cyan).

Although any combination of the first color and the second color may be used for these patches, the colors are defined so that color material of the second color (as the base) can absorb light having wavelengths reflected by color material of the first color efficiently, because it increases efficiency of measurement of light of the first color. For example, a pair of different colors which differ by not less than 90 degrees in hue angle in the CIE LCh color space may be used for the first and second colors. As another example, the first color may be yellow (in other words, a color in the yellow range) and the second color may be cyan or blue (in other words, a color in the cyan or blue range).

Further, in consideration of the fact that optical dot gain occurs in an uncolored part of a halftone print, the tone of the first color of each of the first and second patches is specified corresponding to a physical dot size which causes a sufficient amount of dot gain. For instance, the tone of the first color may be specified for the first patch and second patch so as to correspond to the dot percentage of a halftone print such that an uncolored part covers not less than 50% and not greater than 90% of the whole area of the halftone print. The lower limit of 50% is defined in view of a case where square-shaped halftone dots contact with each other at the four corners, while, the upper limit of 90% is defined by taking ink bleeding into account.

In consideration of absorption of light by the base, the area of the base is filled with color material as wider as possible because a decrease of the uncolored part of the base makes an efficient increase of absorption of light by the base. For instance, the tone of the second color is specified for the base so as to correspond to the dot percentage of a halftone print such that an uncolored part covers not greater than 10% of the whole area of the halftone print. In some printing methods, ink bleeding enlarges halftone dots and a given print may become a solid print because of the ink bleeding, even if the dot percentage specified in print data is less than 100%. Accordingly, the tone or the dot percentage of the second color is specified by taking the condition of paper surface into account.

Now, returning to the flowchart, printed-surface finisher 27 performs the printed-surface finishing according to finishing settings defined in advance, by applying transparent material over a printed surface of a paper sheet on which the group of patches were printed according to the finishing settings (Step S200). Since, in some cases, it may be difficult to form a transparent material pattern in this process, and creation and measurement of a layer of the transparent material pattern may be inaccurate. Accordingly, in one or more embodiments of the present invention, printed-surface finisher 27 forms a transparent material layer all over the surface of the paper sheet.

Successively, in-line colorimeter 28 measures color of the group of patches to obtain the measured color values of the patches (Step S300), and thereafter, outputs the printed and finished paper sheet as a print product. In this process, in-line colorimeter 28 outputs the result the measurement (measured color values) to the built-in controller 21.

Using the measured color values obtained from in-line colorimeter 28, built-in controller 21 calculates the tone values (or dot gains) of the first patch and the second patch to compare the calculated tone values (or calculated dot gains) with respective reference values. Successively, when judging that the comparison gives positive result ("OK" in FIG. 6) (in other words, the tone value of each of the first and second patches falls within the acceptable range defined in advance), built-in controller 21 makes the current print production continue according to the current print settings and the current finishing settings. While, when judging that the comparison gives negative result ("NG" in FIG. 6) (in other words, at least one of the tone values of the first and second patches is out of the acceptable range), built-in controller 21 performs feedback control so as to adjust the print settings and/or the finishing settings according to the comparison result (Step S400).

Referring to the flowchart of FIG. 7, a detailed description is given of the feedback control operations to be conducted in Step S400. The CPU in built-in controller 21 reads a print-product managing program stored in the ROM or storage unit 22 to load the program onto the RAM, and then executes the program, thereby executing the processes of the steps in the flowchart of FIG. 7. In the following description, it is assumed that print settings for printing unit 26 and finishing settings for printed-surface finisher 27 have been already setup through the display and operating unit 24.

At first, built-in controller 21 (measured color value processor 21a) obtains the measured color values (herein, XYZ values) of the group of patches from the in-line colorimeter 28 (Step S401). FIG. 8 illustrates an example of the group of patches. The group of patches in the upper line in FIG. 8 are, in order from the left to the right, patch PA0 being an uncolored patch (a patch of paper color), patch PA being a halftone patch of first color (a 50% yellow patch) and patch PA1 being a solid patch of the first color (a 100% yellow patch). The group of patches in the bottom line in FIG. 8 includes the same patches in the upper line, underlaid with a solid base of second color (which is different from the first color, cyan in this case), which are, in order from the left to the right, patch PB0 being a solid patch of the second color (a 100% cyan patch), patch PB being the halftone patch of the first color underlaid with a solid base of the second color (a 100% cyan and 50% yellow patch) and patch PB1 being a solid patch of the first color underlaid with a solid base of the second color (a 100% cyan and 100% yellow patch).

Built-in controller 21 (measured color value processor 21a) uses the measured color values of the patches PA0, PA, PA1 in the upper line in FIG. 8, to calculate the tone value (or dot gain) of patch PA at the center of the upper line (Step S402). Built-in controller 21 (measured color value processor 21a) further uses the measured color values of the patches PB0, PB, PB1 in the bottom line in FIG. 8, to calculate the tone value (or dot gain) of patch PB at the center of the bottom line (Step S403). As described above, the tone value may be given by using an appropriate formula among various known formulae including the formula using CIE XYZ values specified in ISO 10128 Annex A, the formula using spectral reflectances at specific wavelengths specified in the same standard, the Murray-Davies formula, the Yule-Nielsen formula, and so on.

For instance, in a case of employing the calculation by using CIE XYZ values specified in ISO 10128 Annex A, the tone values of patches PA and PB are given from the following expressions (1) and (2) by using the Z value corresponding to the yellow color component, where $A_{PA}$ and $A_{PB}$ are the tone values of patches PA and PB, $Z_{PA}$ and $Z_{PB}$ are the Z values of patches PA and PB, $Z_{PA0}$ and $Z_{PB0}$ are the Z values of patches PA0 and PB0, and $Z_{PA1}$ and $Z_{PB1}$ are the Z values of patches PA1 and PB1.

$$A_{PA}=(Z_{PA}-Z_{PA0})/(Z_{PA1}-Z_{PA0}) \quad (1)$$

$$A_{PB}=(Z_{PB}-Z_{PB0})/(Z_{PB1}-Z_{PB0}) \quad (2)$$

Built-in controller 21 (condition determiner 21b) then compares the tone values calculated in Step S402 and Step S403 with respective reference values defined in advance (Step S404). For instance, with respect to the group of patches aforementioned, the reference value for patch PA is set at 70, while that for patch PB is set at 56.

As aforementioned, physical dot gain depends on the expected color tone curves (specified in print settings) and the condition of actual print, and it makes the variations of the tone values of patches PA and PB from the respective reference values almost the same. On the other hand, optical dot gain mainly depends on the condition of a finished surface and also depends on the existence of a base. The base absorbs light scattered inside a paper substrate, and it makes the variation of the tone value of patch PB from the reference value small and makes the variation of the tone value of patch PA from the reference value large. The amounts of the variations depend on the thickness of a transparent material layer. That is, optical dot gain makes the degree of variation of the tone value of from the corresponding reference value different between patches PA and PB.

Concretely speaking, physical dot gain mainly correlates with the level of the printing intensity (printing pressure) or the level of density or tone of print of the first color, and optical dot gain mainly correlates with the level of printed-surface finishing or the thickness of a transparent material layer on the print. Therefore, a lower level of the printing intensity (printing pressure) than the reference or a lower level of density or tone of print of the first color than the reference results in decreased tone values of both patch PA and patch PB, and a higher level of the printing intensity (the printing pressure) than the reference or a higher level of density or tone of print of the first color than the reference results in increased tone values of both patch PA and patch PB. On the other hands, a lower level of printed-surface finishing than the reference or a thinner transparent material layer than the reference results in a decreased tone value of patch PA and a slightly decreased tone value of patch PB, and a higher level of printed-surface finishing than the reference or a thicker transparent material layer than the reference results in an increased tone value of patch PA and a slightly increased tone value of patch PB. Accordingly, the current condition of print and/or the current condition of a finished surface can be determined by using the variation tendencies of the tone values of patch PA and patch PB from the respective reference values.

For instance, when the tone values of both patch PA and patch PB are greater than the respective reference values, the condition level of print can be determined as being high (in other words, the level or printing intensity can be determined as being high or the density or tone of print of the first color is determined as being deep). Accordingly, built-in controller 21 (feedback controller 21c) performs the feedback control of printing unit 26 (adjustment of print settings for printing unit 26) so as to decrease the level of the density or tone of the first color (Step S405).

When the tone value of patch PA is greater than the corresponding reference value by a certain value and the tone value of patch PB is slightly greater than the corresponding reference value (that is, greater than the corresponding reference value by a value smaller than the certain value), the condition level of a finished surface can be determined as being high (in other words, the level of printed-surface finishing can be determined as being high or the transparent material layer can be determined as being thick). Accordingly, built-in controller 21 (feedback controller 21c) performs the feedback control of printed-surface finisher 27 (adjustment of finishing settings for printed-surface finisher 27) so as to decrease the thickness of the transparent material layer (Step S406).

When the tone value of patch PA is smaller than the corresponding reference value by a certain value and the tone value of patch PB is slightly smaller than the corresponding reference value (that is, smaller than the corresponding reference value by a value smaller than the certain value), the condition level of a finished surface can be determined as being low (in other words, the level of printed-surface finishing can be determined as being low or the transparent material layer can be determined as being thin). Accordingly, built-in controller 21 (feedback controller 21c) performs the feedback control of printed-surface finisher 27 (adjustment of the finishing settings for printed-surface finisher 27) so as to increase the thickness of the transparent material layer (Step S407).

When the tone values of both patch PA and patch PB are smaller than the respective reference values, the condition level of print can be determined as being low (in other words, the level or printing intensity can be determined as being low or the density or tone of print of the first color is determined as being light). Accordingly, built-in controller 21 (feedback controller 21c) performs the feedback control of printing unit 26 (adjustment of print settings for printing unit 26) so as to increase the level of the density or tone of the first color (Step S408).

The above-described determination whether the tone values (or dot gains) of the first patch and the second patch differ from the respective reference values by almost the same value and whether the tone value (or dot gain) of the first patch differs from the corresponding reference value by a certain value and the tone value (or dot gain) of the second patch differs from the corresponding reference value by a value being smaller than the certain value, can be made by using, for example, the table of FIG. 9 and the graphs of FIG. 10 and FIG. 11 prepared in advance. The table of FIG. 9 represents reference values (including lower limit values, optimum values, and upper limit values) of the tone values in regard to patch PA and patch PB, corresponding to the acceptable condition of print and/or the acceptable condition of a finished surface.

FIG. 10 is a graph representing the range of tone values corresponding to the acceptable condition of a finished surface (the thickness of a transparent material later on print), wherein the horizontal axis indicates the tone value of patch PA, the vertical axis indicates the tone value of patch PB and the shaded area indicates the acceptable range of tone values. This graph includes the lines connecting the points of the upper limit values and lower limit values of the condition of a finished surface in the table of FIG. 9, and the line connecting the points of the lower limit values and the line connecting the points of the higher limit values are extended. As the tone value of patch PA becomes smaller from the optimal value by a certain value and the tone value of patch PB becomes smaller from the optimal value by a value being smaller than the certain value as illustrated by arrow FL in FIG. 10, the condition level of a finished surface becomes lower (the transparent material layer becomes thinner). In view of that, when judging that the tone values calculated in Step S402 and Step S403 fall into the region indicated by the arrow FL, feedback controller 21c performs the feedback control of printed-surface finisher 27 so as to increase the thickness of the transparent material layer. Conversely, as the tone value of patch PA becomes greater from the optimal value by a certain value and the tone value of patch PB becomes greater from the optimal value by a value being smaller than the certain value as illustrated by arrow FH in FIG. 10, the condition level of a finished surface becomes higher (the transparent material layer becomes thicker). In view of that, when judging that the tone values calculated in Step S402 and Step S403 fall into the region indicated by the arrow FH, feedback controller 21c performs the feedback control of printed-surface finisher 27 so as to decrease the thickness of the transparent material layer.

FIG. 11 is a graph representing the range of tone values corresponding to the acceptable condition of print (the density or tone of the print), wherein the horizontal axis indicates the tone value of patch PA, the vertical axis indicates the tone value of patch PB and the shaded area indicates the acceptable range of tone values. This graph includes the lines connecting the points of the upper limit values and lower limit values of the condition of print in the table of FIG. 9, and the line connecting the points of the lower limit values and the line connecting the points of the higher limit values are extended. As the tone values of patch PA and patch PB becomes smaller from the respective optimal values by almost the same value as illustrated by arrow PL in FIG. 11, the condition level of print (the printing intensity or printing pressure) becomes lower (the density or tone level of the print becomes lower). In view of that, when judging that the tone values calculated in Step S402 and Step S403 fall into the region indicated by the arrow PL, feedback controller 21c performs the feedback control of printing unit 26 so as to increase the density or tone level of the print. Conversely, as the tone values of patch PA and patch PB becomes greater from the respective optimal values by almost the same value as illustrated by arrow PH in FIG. 11, the condition level of print (the printing intensity or printing pressure) becomes greater (the density or tone level of the print becomes higher). In view of that, when judging that the tone values calculated in Step S402 and Step S403 fall into the region indicated by the arrow PH, feedback controller 21c performs the feedback control of printing unit 26 so as to decrease the density or tone level of the print.

In the above description, feedback controller 21c performed feedback control to adjust either of the density of print (Step S405 and Step S408) and the thickness of a transparent material layer on the print (Step S406 and Step S407) as the feedback control. However, in a case where both the condition of the print and the condition of the finished surface have changed at a time, feedback controller 21c may adjust both of the density of the print and the thickness of the transparent material layer, in the feedback control. In this control, built-in controller 21 (feedback controller 21c) may make the following determination, referring to the graph of FIG. 12.

FIG. 12 is a graph prepared by combining the graphs of FIG. 10 and FIG. 11. In the graph, the all over graph area is divided into regions R_a through R_h by four depicted lines intersecting each other. From the graph of FIG. 10, regions R_a and R_b are such regions of tone values corresponding to a high condition level of a finished surface (a thick transparent material layer), while regions R_e and R_f are such regions of tone values corresponding to a low condition level of a finished surface (a thin transparent material layer). Additionally, region R_c may be assumed as the region of tone values corresponding to a high condition level of a finished surface (a thick transparent material layer), and region R_g may be the region of tone values corresponding to a low condition level of a finished surface (a thin transparent material layer). From the graph of FIG. 11, regions R_d and R_e are such regions of tone values corresponding to a low condition level of print or a low level of printing pressure (a low level of density or tone of the print), while regions R_h and R_a are such regions of tone values corresponding to a high condition level of print or a high level of printing pressure (a high level of density or tone of the print). Additionally, region R_c may be the region of tone values corresponding to a low condition level of print or a low level of printing pressure (a low level of density or tone of the print), and region R_g may be assumed as the region of tone values corresponding to a high condition level of print or a high level of printing pressure (a high level of density or tone of the print).

In a case where the tone values of both patch PA and patch PB fall within region R_a, feedback controller 21c controls printed-surface finisher 27 (adjusts the finishing settings) so as to make the condition level of the finished surface lower (the transparent material layer thinner) and controls printing unit 26 (adjusts the print settings) so as to make the condition level of the print or the printing intensity lower (the density or tone level of the print lower). In a case where the tone values of both patch PA and patch PB fall within region R_b, feedback controller 21c controls printed-surface finisher 27 (adjusts the finishing settings) so as to make the condition level of the finished surface lower (the transparent material layer thinner). In a case where the tone values of both patch PA and patch PB fall within region R_d, feedback controller 21c controls printing unit 26 (adjusts the print settings) so as to make the condition level of the print or the printing intensity higher (the density or tone level of the print higher). In a case where the tone values of both patch PA and patch PB fall within region R_e, feedback controller 21c controls printed-surface finisher 27 (adjusts the finishing settings) so as to make the condition level of the finished surface higher (the transparent material layer thicker) and controls printing unit 26 (adjusts the print settings) so as to make the condition level of the print or the printing intensity higher (the density or tone level of the print higher). In a case where the tone values of both patch PA and patch PB fall within region R_f, feedback controller 21c controls printed-surface finisher 27 (adjusts the finishing settings) so as to make the condition level of the finished surface higher (the transparent material layer thicker). In a case where the tone values of both patch PA and patch PB fall within region R_h, feedback controller 21c controls printing unit 26 (adjusts the print settings) so as to make the condition level of the print or the printing intensity lower (the density or tone level of the print lower). Further, in a case where the tone values of both patch PA and patch PB fall within region R_c, feedback controller 21c may control printed-surface finisher 27 (adjust the finishing settings) so as to make the condition level of the finished surface lower (the transparent material layer thinner) and control printing unit 26 (adjust the print settings) so as to make the condition level of the print or the printing intensity higher (the density or tone level of the print higher). In a case where the tone values of both patch PA and patch PB fall within region R_g, feedback controller 21c may control printed-surface finisher 27 (adjust the finishing settings) so as to make the condition level of the finished surface higher (the transparent material layer thicker) and control printing unit 26 (adjust the print settings) so as to make the condition level of the print or the printing intensity lower (the density or tone level of the print lower).

In the feedback control, built-in controller 21 (feedback controller 21c) may automatically perform the feedback control of printing unit 26 and/or printed-surface finisher 27 on the basis of a result of comparison derived from Step S404. Alternatively, built-in controller 21 (feedback controller 21c) may cause display and operating unit 24 to display a result of determination of at least one of the condition of the print and the condition of the finished surface. For example, built-in controller 21 (feedback controller 21c) may cause display and operating unit 24 to display the calculation result of the tone values of both patch PA and patch PB with being associated with (together with) any one of the table of FIG. 9 and the graphs of FIG. 10 through FIG. 12. It allows an operator to check the displayed result and then manually perform the feedback control of printing unit 26 and/or printed-surface finisher 27. In other words, it allows the operator to adjust the tone curve for printing so that the print reflects the displayed determination result, to adjust the application amount of inkjet varnish, or to adjusting the pressure of a cylinder for varnish application, etc.

As described in the foregoing, the disclosed printing system includes a controller, a printer, a finisher for printed-surface finishing and a colorimeter, and manages the quality of print products by performing the following operations. That is, the printer prints out a color chart and the finisher finishes the color chart so as to apply transparent material onto color patches in the color chart, where the color chart includes a first patch being a halftone patch of first color, a second patch being the halftone patch of the first color underlaid with a solid base of second color, and comparative patches prepared by increasing and decreasing tone of the first color of each of the first patch and the second patch. After the colorimeter measures color of the patches, the controller uses measured color values of the patches obtained from the colorimeter, to calculate a tone value or dot gain of each of the first patch (patch PA) and the second patch (patch PB). The controller then compares the tone values or the dot gains of the first patch and the second patch, with respective reference values predetermined, and uses a fact that variations of the tone values or the dot gains of the first patch and the second patch from the respective reference values are different from each other depending on the condition of print and the condition of a finished surface, to determine the current condition of print given by the printer and the current condition of a finished surface given by the finisher by using a result of the comparison (a difference between the first patch and the second patch in variation of the tone value or dot gain from the corresponding reference value). The controller may optionally perform feedback control of the printer and/or finisher to adjust print settings and/or finishing settings, on the basis of the determination result. The operations easily provide stable quality and enhanced productivity of print products.

It should be noted that the present invention should not be limited to the above-described examples of one or more embodiments, and the constitution and control of the system and its components can be modified appropriately, unless the modification deviates from the intention of the present invention.

For instance, the disclosed printing system used the six patches illustrated in FIG. 8, as an example of a group of patches for use in the control executed by the controller, but the scope of the disclosure is not limited to the above. It is noted that the combination of the first color and the second color, the dot percentages of the first color and the second color, the number of patches, the shape of the patches, the arrangement of the patches, the position of the patches on a paper sheet, etc., may be chosen arbitrarily. Further, the color chart may include only the group of patches or include other patches together with the group of patches. The color chart (the group of patches) may be printed together with another print (a print product based on a print job) on a paper sheet.

The present invention relates to a controller, a color chart and a computer-readable program for managing print products, and is applicable to a controller for use in a printing system including a printer, a finisher for printed-surface finishing and a colorimeter; a method of managing quality of print products in the printing system; a color chart including patches for managing quality of print products; a computer-readable program for managing print products to be executed in the controller; and a non-transitory recording medium storing the computer-readable program for managing print products.

Although the disclosure has been described with respect to only a limited number of embodiments, those skilled in the art, having benefit of this disclosure, will appreciate that various other embodiments may be devised without departing from the scope of the present invention. Accordingly, the scope of the invention should be limited only by the attached claims.

The invention claimed is:

1. A controller for use in a printing system including a printer that prints a color chart, wherein the color chart includes a first patch that is a halftone patch of first color, a second patch that is the halftone patch of the first color underlaid with a solid base of second color, the second color is different from the first color, and a plurality of comparative patches including patches prepared by increasing and decreasing tone of the first color of the first patch and patches prepared by increasing and decreasing tone of the first color of the second patch; a finisher that finishes a printed surface of the color chart with transparent material; and a colorimeter that measures color of the first patch, wherein the second patch and the plurality of comparative patches in the color chart finished with the transparent material, the controller comprises:

a storage; and
a hardware processor operatively connected to the storage, wherein the hardware processor:
obtains measured color values of the first patch, the second patch and the plurality of comparative patches, from the colorimeter;
calculates a tone value or dot gain of each of the first patch and the second patch based on the obtained measured color values;
determines a current condition of print given by the printer and a current condition of a finished surface given by the finisher using a result of comparison of the tone values or the dot gains of the first patch and the second patch with respective reference values, and
determines that the current condition of the finished surface is in unacceptable condition when:
the tone value or the dot gain of the first patch differs from the corresponding reference value by a first value, and
the tone value or the dot gain of the second patch differs from the corresponding reference value by a second value that is smaller than the first value.

2. The controller of claim 1, wherein
the hardware processor further:
uses the measured color value of the first patch and the measured color values of the comparative patches for the first patch to calculate the tone value or the dot gain of the first patch, and
uses the measured color value of the second patch and the measured color values of the comparative patches for the second patch to calculate the tone value or the dot gain of the second patch.

3. The controller of claim 1, wherein
the hardware processor further executes feedback control of the printer or the finisher by adjusting print settings for the printer or finishing settings for the finisher based on a result of determination of the current condition of the print or the current condition of the finished surface.

4. The controller of claim 1,
wherein the hardware processor determines that the condition of the print is in unacceptable condition when:
the tone value or the dot gain of the first patch differs from the corresponding reference value by a third value, and
the tone value or the dot gain of the second patch differs from the corresponding reference value by a fourth value same as the third value.

5. The controller of claim 1, further comprising:
a display, wherein
the hardware processor further causes the display to display a result of determination of at least one of the current condition of the print and the current condition of the finished surface.

6. The controller of claim 5, wherein
the hardware processor further causes the display to display the calculated tone values or dot gains of the first patch and the second patch together with a table or a graph representing an acceptable range of the tone values or dot gains.

7. The controller of claim 1, wherein
the color chart comprises:
six patches of
the first patch,
the second patch,
a patch of paper color and a solid patch of the first color, for calculating a tone value or dot gain of the first patch, and
a solid patch of the second color and a solid patch of the first color underlaid with a solid base of the second color, for calculating a tone value or dot gain of the second patch.

8. The controller of claim 1,
wherein the first color and the second color differ from each other by not less than 90 degrees in hue angle in a CIE LCh color space.

9. The controller of claim 1,
wherein the first color is yellow and the second color is cyan or blue.

10. The controller of claim 1,
wherein the tone of the first color specified for the first patch and the second patch corresponds to a dot percentage of a halftone print such that an uncolored part covers not less than 50% and not greater than 90% of an area of the halftone print.

11. The controller of claim 1,
wherein the tone of the second color specified for the base corresponds to a dot percentage of a halftone print such that an uncolored part covers not greater than 10% of an area of the halftone print.

12. A non-transitory recording medium storing a computer-readable program executed in a controller of a printing system including a printer, a finisher that executes printed-surface finishing and a colorimeter, the program comprising instructions that when executed by a hardware processor of the controller causes the hardware processor to execute:
obtaining measured color values of patches in a color chart from the colorimeter, wherein the color chart includes:
a first patch that is a halftone patch of first color,
a second patch that is the halftone patch of the first color underlaid with a solid base of second color,
the second color is different from the first color, and
a plurality of comparative patches including patches prepared by increasing and decreasing tone of the first color of the first patch and patches prepared by increasing and decreasing tone of the first color of the second patch, the color chart is printed by the printer and finished by the finisher with transparent material;
calculating a tone value or dot gain of each of the first patch and the second patch based on the measured color values;
determining current condition of print given by the printer and current condition of a finished surface given by the finisher, by using a result of comparison of the tone values or the dot gains of the first patch and the second patch with respective reference values, and
determining that the condition of the finished surface is in unacceptable condition when:
the tone value or the dot gain of the first patch differs from the corresponding reference value by a first value, and
the tone value or the dot gain of the second patch differs from the corresponding reference value by a second value that is smaller than the first value.

13. The non-transitory recording medium of claim 12, wherein
the hardware processor further:
uses the measured color value of the first patch and the measured color values of the comparative patches for the first patch, to calculate the tone value or the dot gain of the first patch, and
uses the measured color value of the second patch and the measured color values of the comparative patches for the second patch, to calculate the tone value or the dot gain of the second patch.

14. The non-transitory recording medium of claim 12, wherein
the hardware processor further executes feedback control of the printer or the finisher, by adjusting print settings for the printer or finishing settings for the finisher based on a result of determination of the current condition of the print or the current condition of the finished surface.

* * * * *